(12) United States Patent
Chiang

(10) Patent No.: US 7,464,434 B2
(45) Date of Patent: Dec. 16, 2008

(54) SECURING DEVICE FOR A WINDSCREEN WIPER CONNECTOR

(75) Inventor: Min-Heng Chiang, Taipei Hsien (TW)

(73) Assignee: Fu Gang Co., Ltd., Taipei Hsien (TW)

( * ) Notice: Subject to any disclaimer, the term of this patent is extended or adjusted under 35 U.S.C. 154(b) by 0 days.

(21) Appl. No.: 11/686,355

(22) Filed: Mar. 15, 2007

(65) Prior Publication Data

US 2008/0222829 A1 Sep. 18, 2008

(51) Int. Cl.
*B60S 1/40* (2006.01)
(52) U.S. Cl. .................. 15/250.32; 15/250.43; 403/24; 403/363
(58) Field of Classification Search ............. 15/250.32, 15/250.351, 250.43, 250.44; 403/24, 363
See application file for complete search history.

(56) References Cited

U.S. PATENT DOCUMENTS

| | | | | |
|---|---|---|---|---|
| 2,176,373 A | * | 10/1939 | Sence | 15/250.32 |
| 2,310,751 A | * | 2/1943 | Scinta | 15/250.32 |
| 3,390,416 A | * | 7/1968 | Scinta | 15/250.32 |
| 3,408,678 A | * | 11/1968 | Linker | 15/250.05 |
| 4,348,782 A | * | 9/1982 | Fournier | 15/250.32 |
| 4,967,438 A | * | 11/1990 | Arai et al. | 15/250.32 |
| 6,279,191 B1 | * | 8/2001 | Kotlarski et al. | 15/250.201 |
| 6,581,237 B1 | * | 6/2003 | Kotlarski | 15/250.32 |

FOREIGN PATENT DOCUMENTS

EP 0141186 * 5/1985

* cited by examiner

*Primary Examiner*—Gary K Graham
(74) *Attorney, Agent, or Firm*—Leong C. Lei

(57) ABSTRACT

A securing device for a windscreen wiper connector is disclosed. The securing device comprises a left and right housing which are symmetrical to each other, having an engaging section at the center upper edge thereof, wherein the bottom edge of the engaging section is a recess, and the interior of the left and right housing is provided with a sleeve and a protrusion, and the two sides of the bottom edge are respectively provided with a grip section, and the center position of the grip section is an opening, whereby the left and right housing are secured to the lateral sides of the steel plate of the wiper such that the sleeve and the protrusion of the housing engage with each other, and the sleeve and the protrusion of the housing engage with each other, and the sleeve and the protrusion of the top edge of the engaging section secure the securing device at the middle section of he soft frame wiper, thereby the engaging section at the top edge engages with different type of connector for the linkage of the wiper arm of a vehicle.

1 Claim, 7 Drawing Sheets

SECURING DEVICE FOR A WINDSCREEN WIPER CONNECTOR

BACKGROUND OF THE INVENTION (a) Technical Field of the Invention

The present invention relates to securing device, and in particular, a securing device for connector used in different types of windscreen wiper.

(b) Description of the Prior Art

Conventional mounting of soft frame wiper with a wiper arm is shown in FIG. 1. The center section of the soft frame wiper employs a T-shaped securing seat 11 secured to steel plate of the wiper. A connector 12 is used to connect the securing seat 11 to the wiper arm. The drawback of this conventional securing seat 11 is that only a single type of connector 12 can be employed to connect with a specific wiper arm. Further, after the connection of the wiper arm, a cap has to be used, and therefore, it is rather troublesome in installation. In addition, it is not convenient in implementation of the securing seat on different types of wipers. Accordingly, it is an object of the present invention to provide a securing device for a windscreen wiper connector.

SUMMARY OF THE INVENTION

The primary purpose of the present invention is to provide a securing device for a windscreen wipe connector comprising a left and right housing which are symmetrical to each other, having an engaging section at the center upper edge thereof, wherein the bottom edge of the engaging section is a recess, and the interior of the left and right housing is provided with a sleeve and a protrusion, and the two sides of the bottom edge are respectively provided with a grip section, and the center position of the grip section is an opening, whereby the left and right housing are secured to the lateral sides of the steel plate of the wiper such that the sleeve and the protrusion of the housing engage with each other, and the sleeve and the protrusion of the top edge of the engaging section secure the securing device at the middle section of the soft frame wiper, thereby the engaging section at the top edge engages with different type of connector for the linkage of the wiper arm of a vehicle.

Yet still a further object of the present invention is to provide a securing device for a windscreen wiper connector, wherein the engaging sections at the top edge center of the left and right housing are respectively provided with a sleeve and a corresponding protrusion, thereby the mutual engaging of the sleeve and the protrusion causes the left and right housing to firmly combine.

Yet a further object of the present invention is to provide a securing device for a windscreen wiper connector, wherein the center of the bottom edge of the left and right housing are respectively provided with a semi-circular engaging protrusion such that the left and right housing combine to form a cylindrical protrusion such that position is formed for the center circular hole at the soft frame wiper steel plate.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
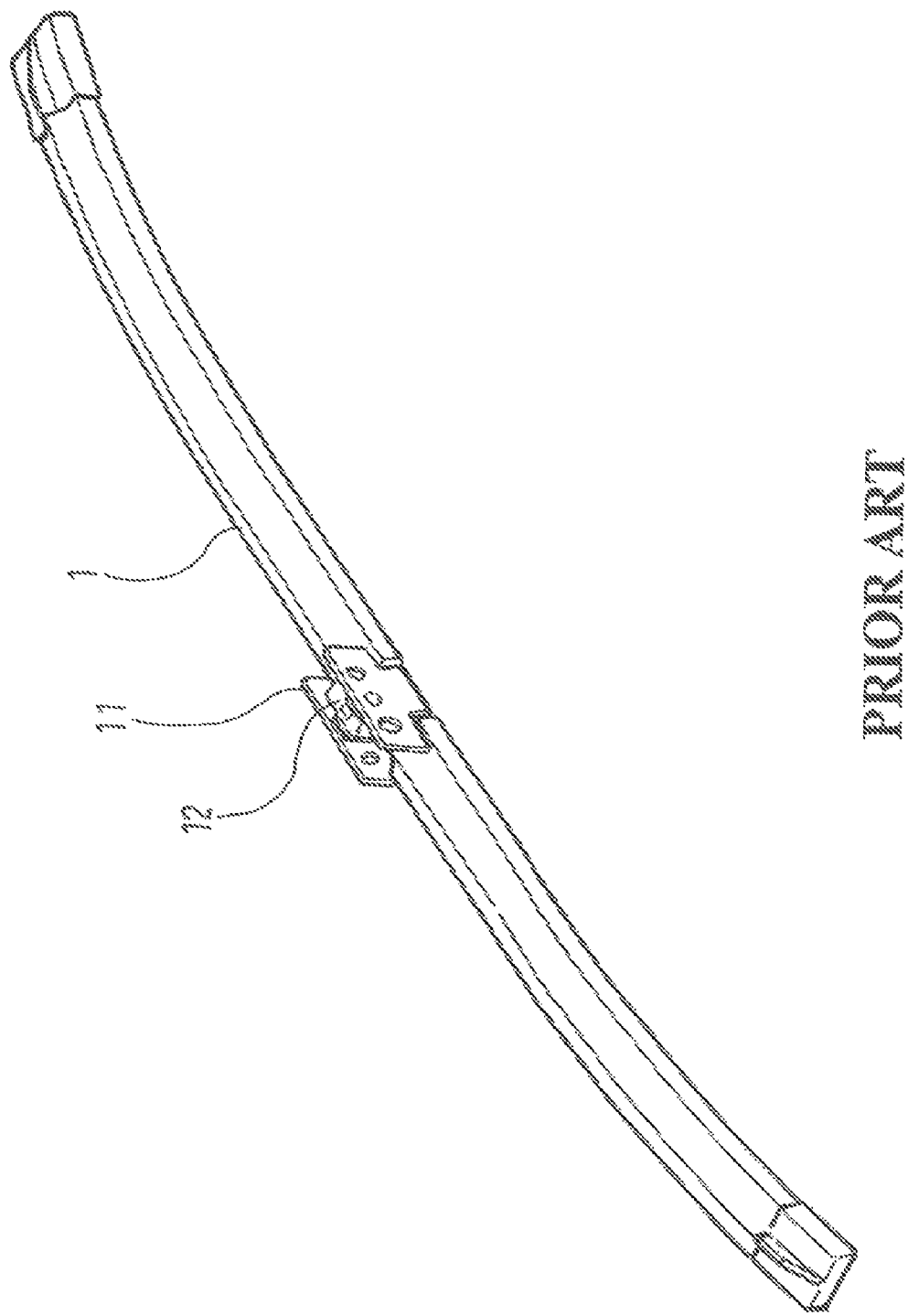
FIG. 1 is a perspective view of a convention windscreen wiper.
Figure 2:
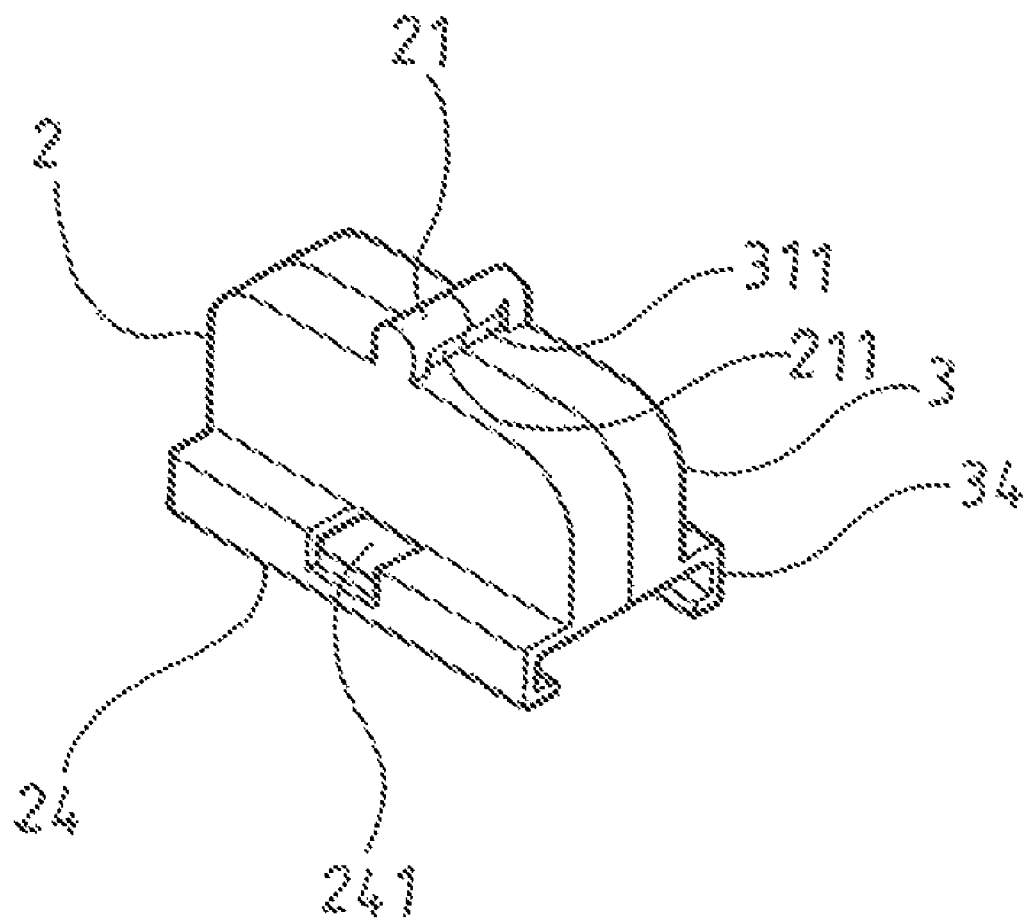
FIG. 2 is a perspective view of a preferred embodiment of the securing device in accordance with the present invention.
Figure 3:
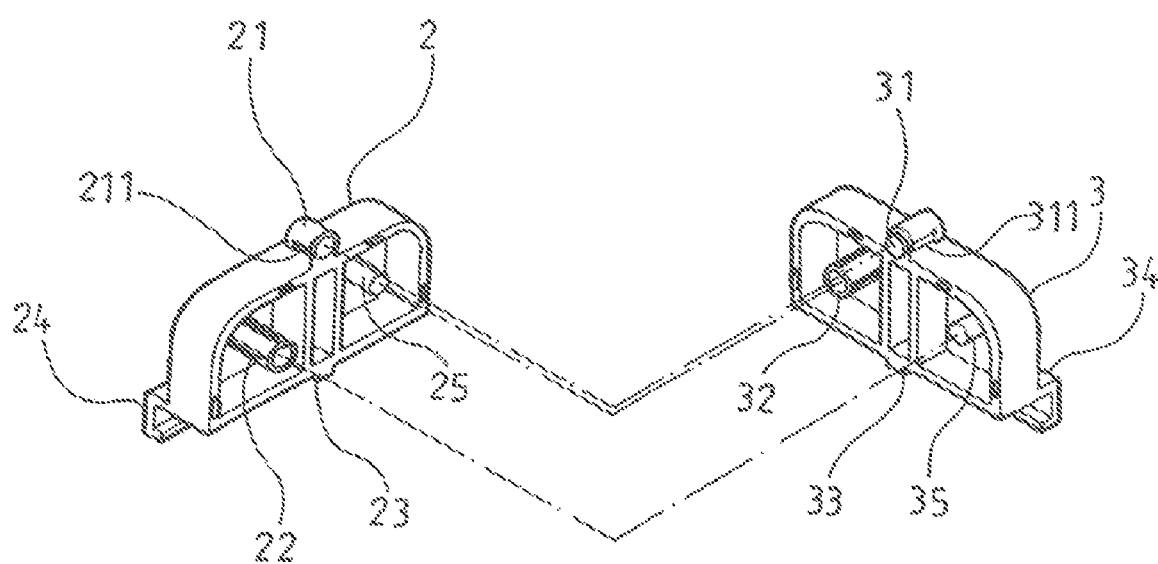
FIG. 3 is a perspective exploded view of the preferred embodiment shown in FIG. 2 of the present invention.
Figure 4:
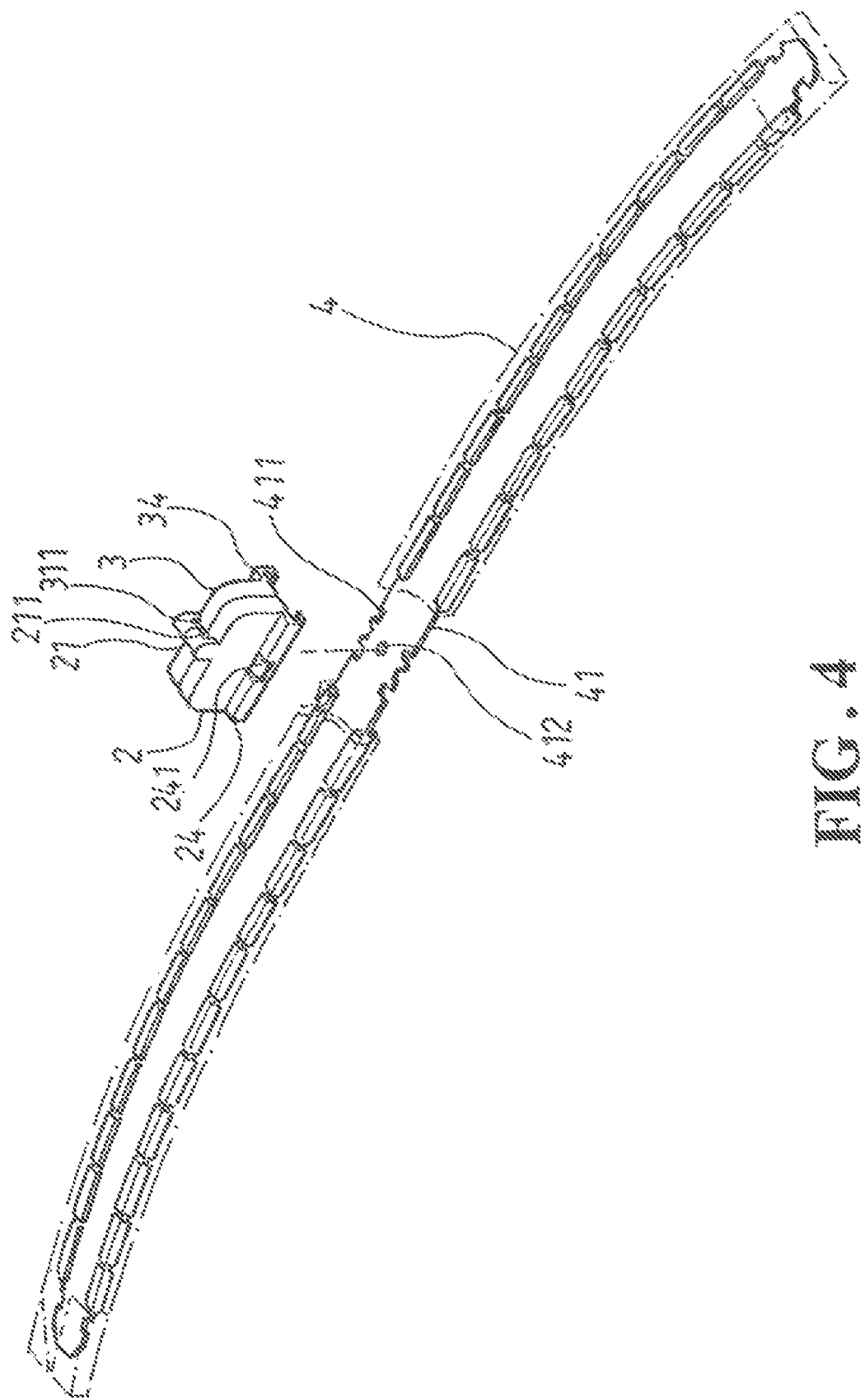
FIG. 4 is a schematic view showing the mounting of the securing device on a wiper of the present invention.

Referring to FIGS. 2, 3 and 4, there is shown a securing device for a windscreen wiper connector which comprises two symmetrical elongated left and right housings 2, 3. The top edge center of each of the left and right housings 2, 3 is provided with a circular engaging section. The engaging section comprises a sleeve 21 at the left housing, and the right housing 3 has a corresponding protrusion 31. The sleeve 21 of the engaging section and the bottom edge of the protrusion 31 are provided with recesses 211, 311.

The left and right housings 2, 3 are correspondingly provided with sleeves 22, 32 and protrusions 25, 35, and the left and right housings 2, 3 are provided at the bottom edge center with semi-circular engaging protrusions 23, 33. The two lateral sides of the bottom edge of the left and right housings 2, 3 are provided with gripping sections 24, 34. The two gripping sections 24, 34 are each provided at the center position with an opening 241.

The combination of the above described components forms into a securing device for the connector of a wiper such that the left and right housings 2, 3 are secured at the two sides of the steel plate 41 at the center section of the soft-frame wiper 4. Hence, the sleeves 22, 32 and the protrusions 25, 35 of the left and right housings 2, 3 engage with each other, and the sleeve 21 of the engaging section is engaged with the protrusion 31, and the securing device is secured at the center section of the soft-frame wiper 4. The engaging section at the top edge is engaged with connector of different type so as to allow linkage to the wiper arm on the vehicle.

Figure 5:
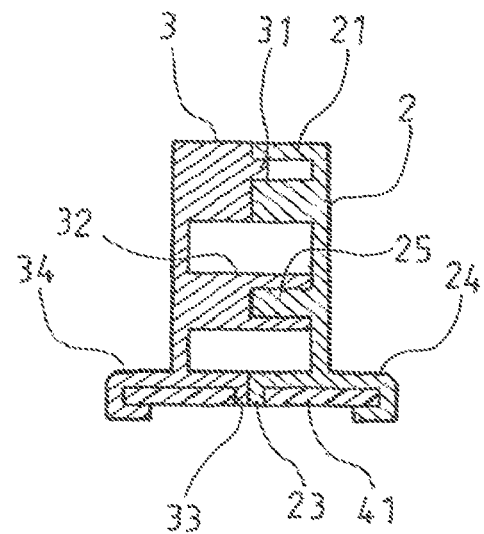
FIGS. 5 and 6 are sectional views of the securing device on the wiper in accordance with the present invention.

As shown in FIGS. 4 and 5, when in combination of the components of the present invention, the left and right housings 2, 3 are mounted at the side of the steel plate 41 of the center section of the soft-frame wiper 4, such that the notch section 411 of the steel plate 41 is engaged with the gripping sections 24, 34 at the two lateral sides at the bottom edge of the left and right housings 2, 3. The engaging protrusions 23, 33 will form into a cylindrical protrusion after the left and right housings 2, 3 are combined for the mounting of the center circular hole 412 of the steel plate 41 of the wiper 4 to form into a position of the securing device. Thus, the steel plate 41 can securely mounted at the gripping sections 24, 34.

Figure 6:
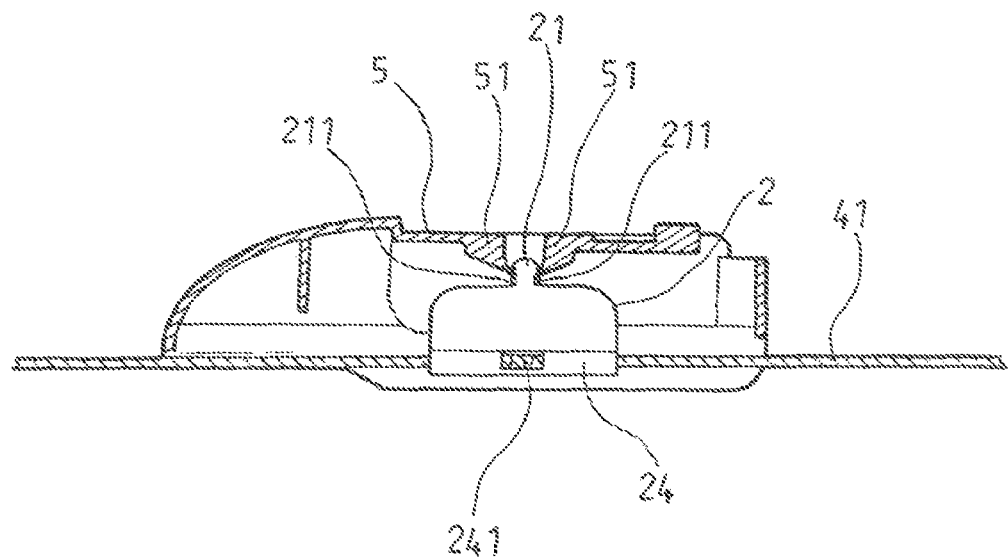
Figure 7:
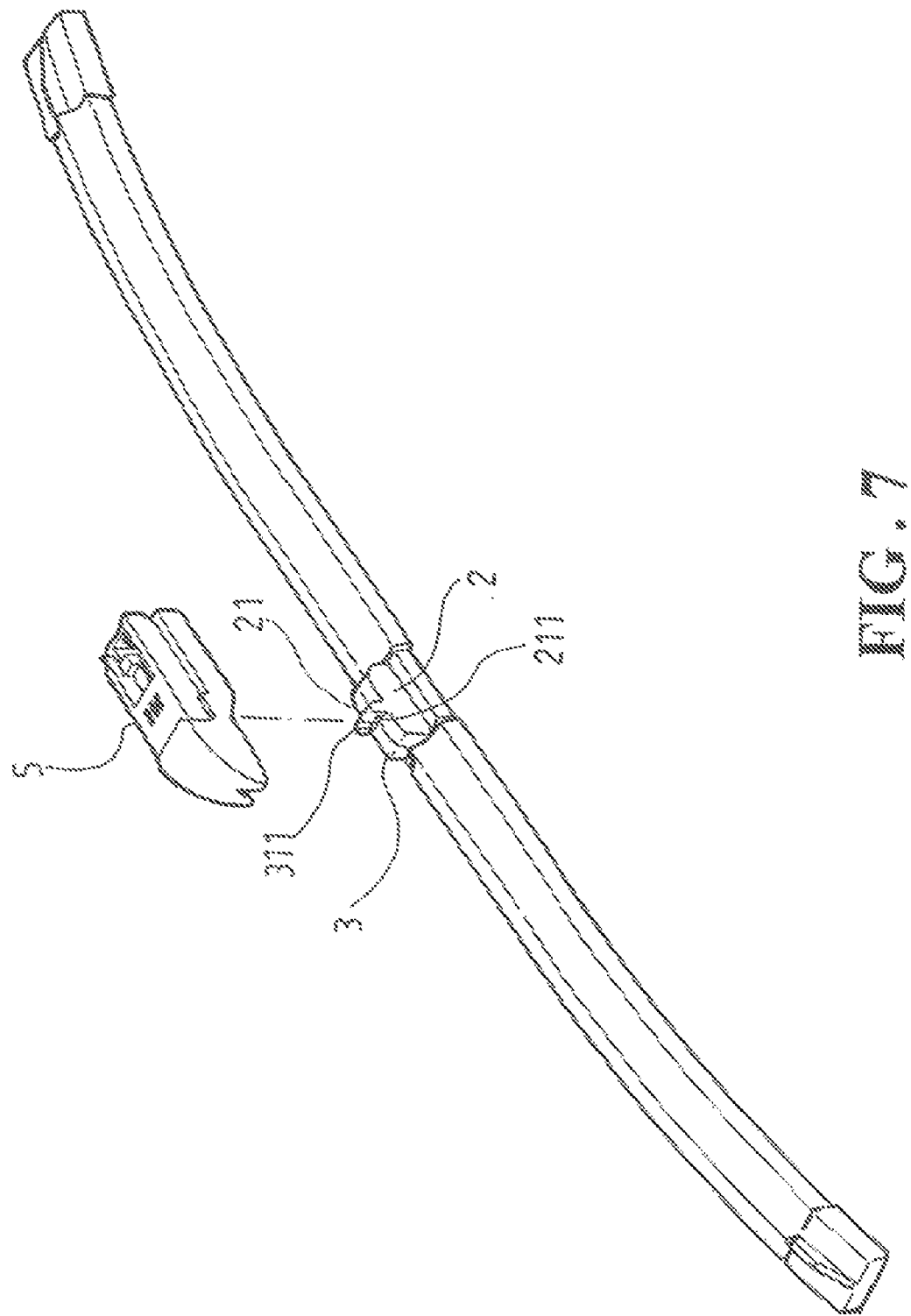
FIG. 7 is a schematic view showing the mounting of the securing device of the present invention with a connector.

As shown in FIGS. 6 and 7, after the securing device is secured at the soft-frame wiper 4, the securing device is engaged with the connector 5, and due to the fact that the symmetrical fastening plate 51 is provided within the connector 5, the engaging section is engaged and secured with the fastening plate 51, and the top edge of the fastening plate 51 is tightly gripped with the recesses 211, 311, the securing device is prevented from dislocation.

Figure 8:
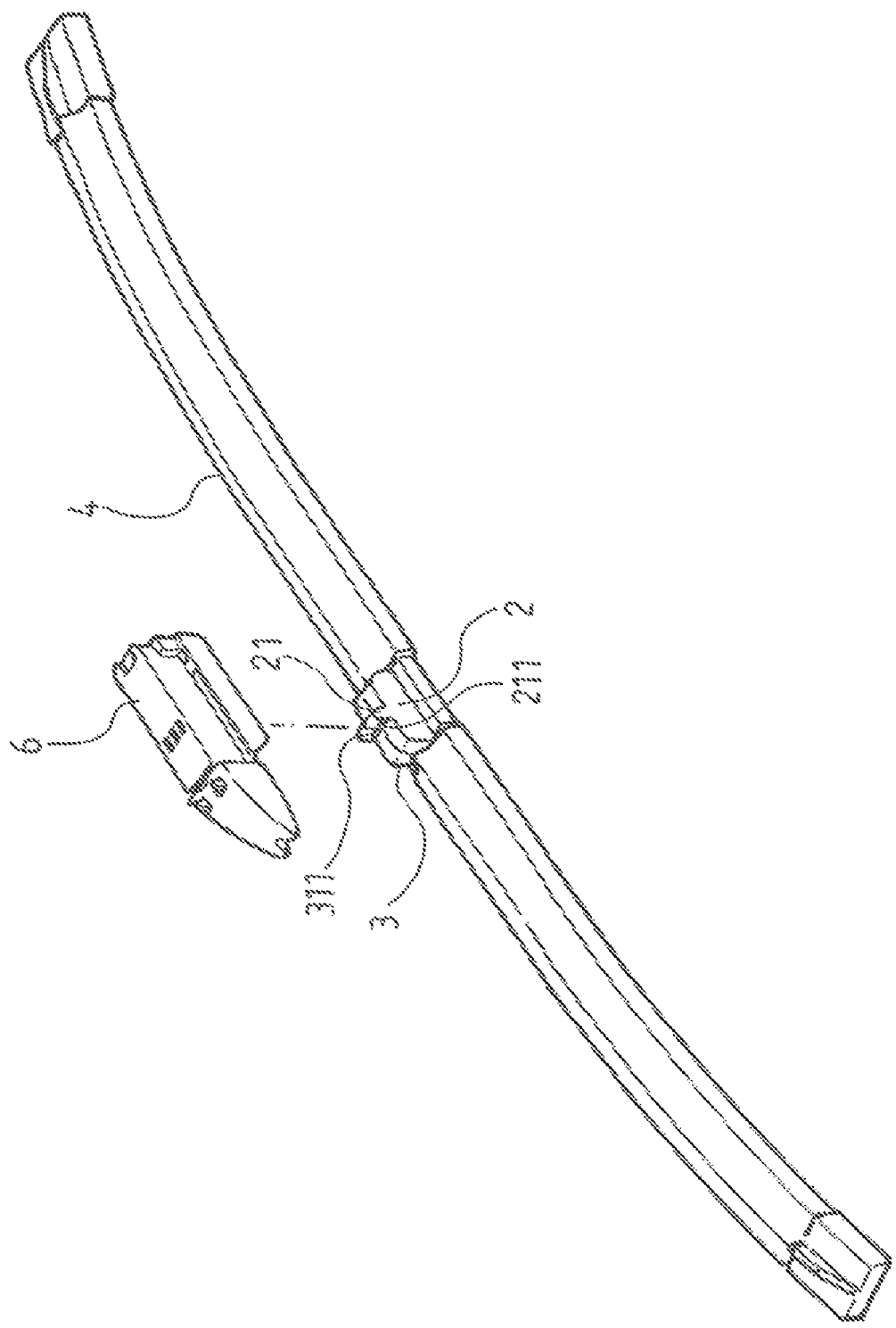
FIG. 8 is a circuit diagram of another preferred embodiment of the present invention.

As shown in FIG. 8, the securing device of the present invention can be used for different type of connector 6 for windscreen wipers. Similarly, the connector 6 is provided with symmetrical fastening plate such that the engaging section at the center of the top edge of the securing device is secured with the fastening plate.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A securing device for a windscreen wiper connector comprising:

a left and a right housing which are symmetrical to each other and each have an engaging section at a center upper edge thereof, wherein a bottom edge of each engaging section has a recess, and an interior of each left and right housing is provided with a sleeve and a protrusion, and each housing has a bottom edge respectively provided with a gripping section, and a center position of each gripping section has an opening, whereby the left and right housings are secured to lateral sides of a steel plate of a soft frame wiper by the gripping sections, such that the sleeve and the protrusion in the interior of the respective housings engage with each other, and the sleeve and a protrusion of a engaging section secure a securing device at a middle section of the soft frame wiper, and a center of the bottom edge of the left and right housings are respectively provided with a semi-circular engaging protrusion such that the left and right housings combine to form a cylindrical protrusion for engaging with a center circular hole of the steel plate, thereby enabling the engaging section to engage with different types of connectors for linkage of a wiper arm of a vehicle.

* * * * *